Figure 1:
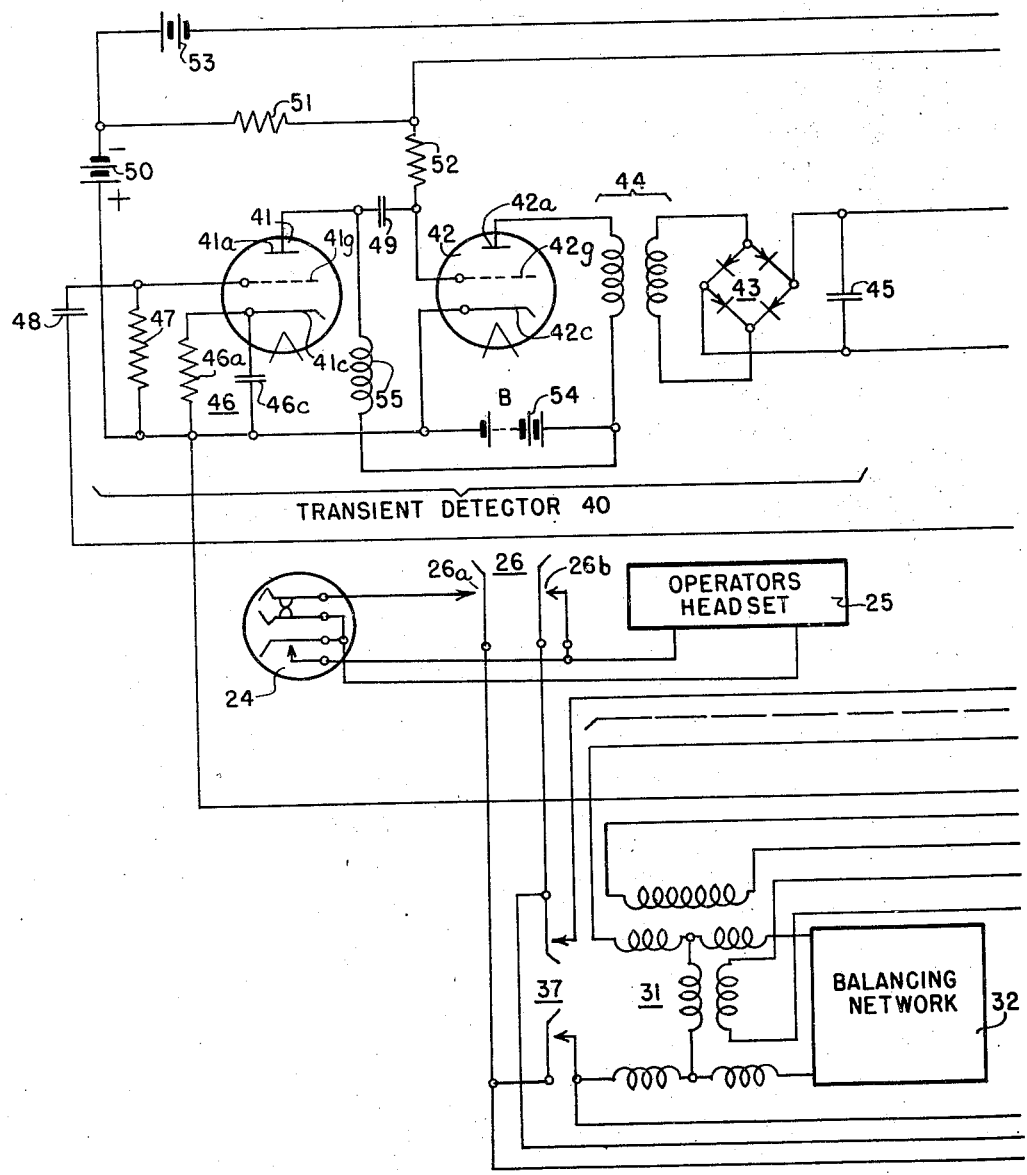

Oct. 25, 1949.    B. J. KUCERA    2,485,748
OBSERVATION APPARATUS WITHOUT WIRE CHANGEOVERS
Original Filed July 15, 1942    7 Sheets-Sheet 1

INVENTOR.
BARNEY J. KUCERA
BY
Davis, Lindsey, Smith & Shonts
ATTORNEYS

Oct. 25, 1949.     B. J. KUCERA     2,485,748
OBSERVATION APPARATUS WITHOUT WIRE CHANGEOVERS
Original Filed July 15, 1942     7 Sheets-Sheet 3

INVENTOR.
BARNEY J. KUCERA
BY
Davis, Lindsey, Smith & Shonts
ATTORNEYS

Oct. 25, 1949.  B. J. KUCERA  2,485,748
OBSERVATION APPARATUS WITHOUT WIRE CHANGEOVERS
Original Filed July 15, 1942  7 Sheets-Sheet 5
FIG. 5
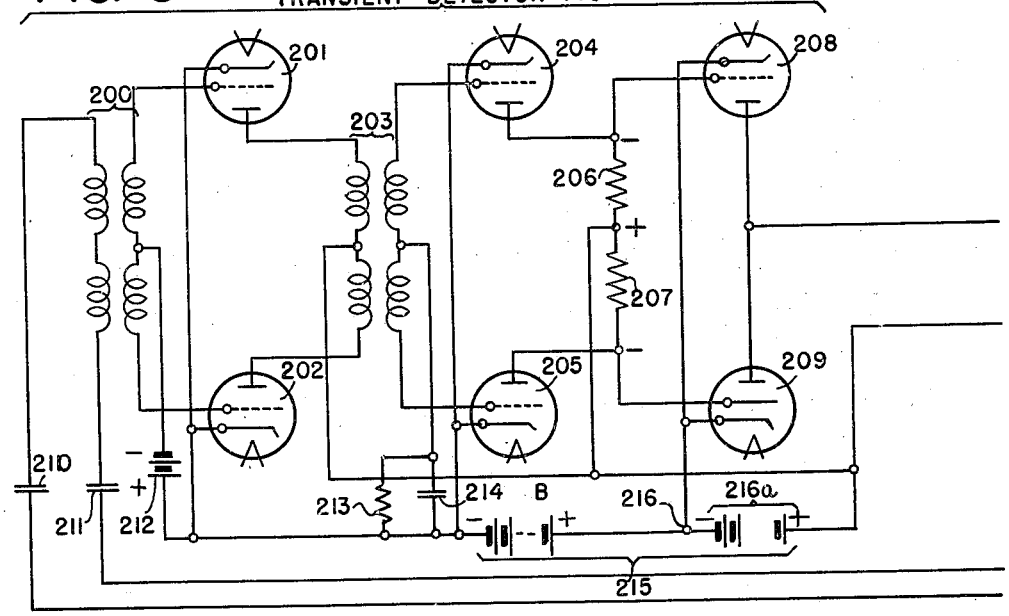
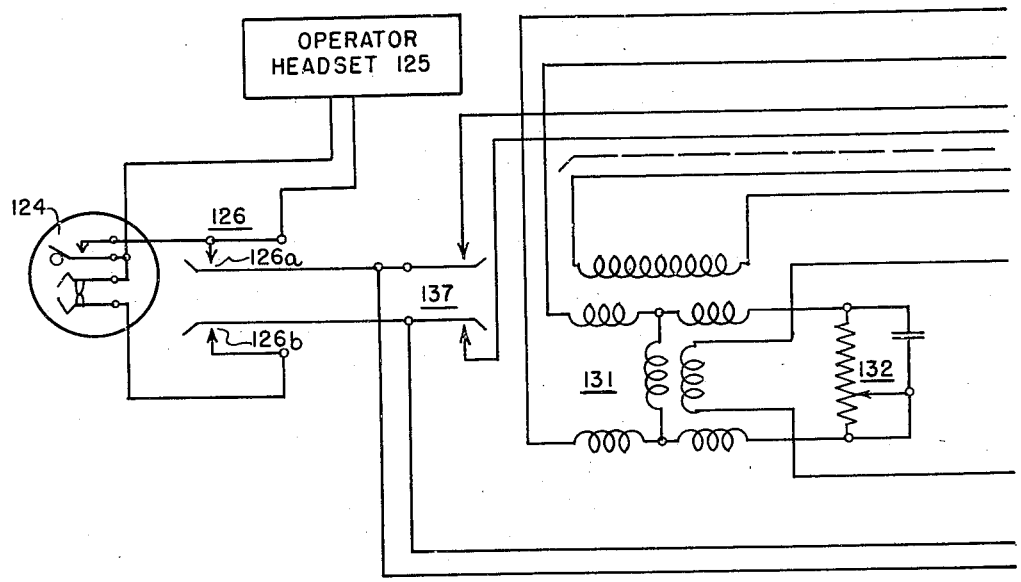
INVENTOR.
BARNEY J. KUCERA
BY
Davis, Lindsey, Smith & Shonts
ATTORNEYS Oct. 25, 1949.     B. J. KUCERA     2,485,748
OBSERVATION APPARATUS WITHOUT WIRE CHANGEOVERS
Original Filed July 15, 1942     7 Sheets—Sheet 7
FIG. 7
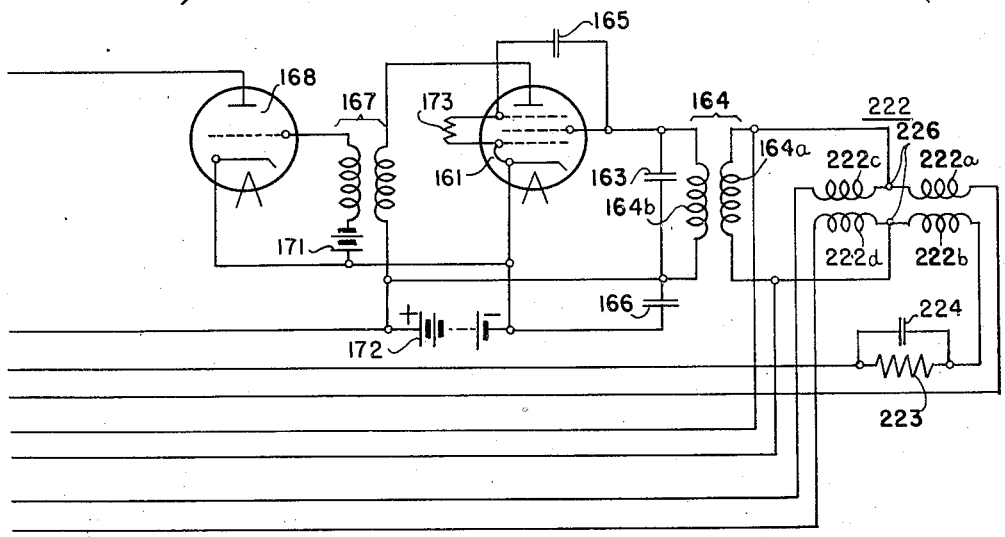
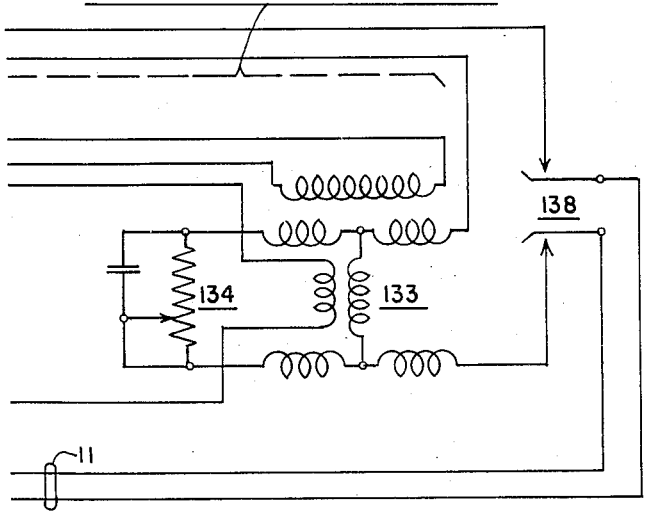
INVENTOR.
BARNEY J. KUCERA
BY
Davis, Lindsey, Smith & Shonts
ATTORNEYS Patented Oct. 25, 1949

2,485,748

UNITED STATES PATENT OFFICE 2,485,748

OBSERVATION APPARATUS WITHOUT WIRE CHANGEOVERS

Barney J. Kucera, Cleveland, Ohio, assignor to Automatic Electric Laboratories, Inc., Chicago, Ill., a corporation of Delaware Original application July 15, 1942, Serial No. 450,987. Divided and this application January 15, 1945, Serial No. 572,871

12 Claims. (Cl. 179—175.2)

1

The present invention relates to signaling apparatus and, more specifically, to improvements in apparatus for secretly observing all calls handled at any selected substation of an automatic telephone system. This application is a division of the copending application of Barney J. Kucera, Serial No. 450,987, filed July 15, 1942, now U. S. Patent No. 2,457,046, granted Dec. 21, 1948.

In the usual wire tapping or call observing arrangement, jumper connections are made to the conductors of the line extending to the substation which is to be observed. Such jumper connections may be made either at the line terminals of the main frame in the terminating office, at some point along the line extending to the substation under observation, or on the premises where the substation under observation is located. This arrangement has the disadvantage that the equipment must be moved from place to place and the wiring connections must be changed, in order operatively to associate the observing equipment with different substations of the system.

It is an object of the present invention, therefore, to provide improved apparatus of the character described, which is so arranged that any desired substation of an automatic system may be brought under observation from a particular station or point of observation, without changing the wiring of the apparatus and without running jumper connections to the conductors of the line extending to the substation which it is desired to observe.

In the illustrated embodiments of the invention, the observing equipment is operatively associated with a desired substation by first routing a connection from the point of observation through the automatic switching apparatus of the system to the desired substation. The connection is then held from the observation point after it is released at the substation and, as finally completed, includes a reactive talking bridge at the final switching stage thereof. This talking bridge has the effect of preventing dial impulses from being transmitted from the substation to the point of observation. More specifically, with the bridge included in the connection, operations of the substation calling device and of the hook switch provided at the substation under observation manifest themselves as electrical voltage transients at the observed end of the connection. Moreover, the opening and closing of the signaling circuit at the substation end thereof, incident to the initiation of a call

2 at the substation, causes corresponding changes in the impedance of the signaling circuit as measured at the observed end thereof.

It is another object of the invention to provide in a switching and signaling system of the character described, an improved arrangement for utilizing the transients produced on the signaling circuit for effecting the extension of a connection from the signaling circuit to another line.

According to another object of the invention, facilities controlled by certain of the transients appearing on the signaling circuit are provided for transmitting a signal of limited duration back over the circuit.

According to still another object of the invention, those facilities which are provided in the apparatus to respond to transients appearing on the signaling circuit, are arranged in an improved manner to discriminate between a transient produced by opening the signaling circuit and a transient produced by closing of the signaling circuit.

It is another object of the invention to provide in a signaling and switching arrangement of the character described, improved apparatus for transmitting impulses to automatic switching equipment, which apparatus is arranged to be controlled by the changes in impedance of the signaling circuit, as measured at one end thereof, which result from the opening and closing of the circuit at the other end thereof.

According to still another object of the invention, provisions are made in the apparatus for preventing the impulse transmitting equipment, and that apparatus which responds to the transients appearing on the signaling circuit, from falsely responding to the signal and transient voltages which are impressed on the circuit incident to the operation of the automatic switching equipment to extend a connection from the signaling circuit.

Figure 2:
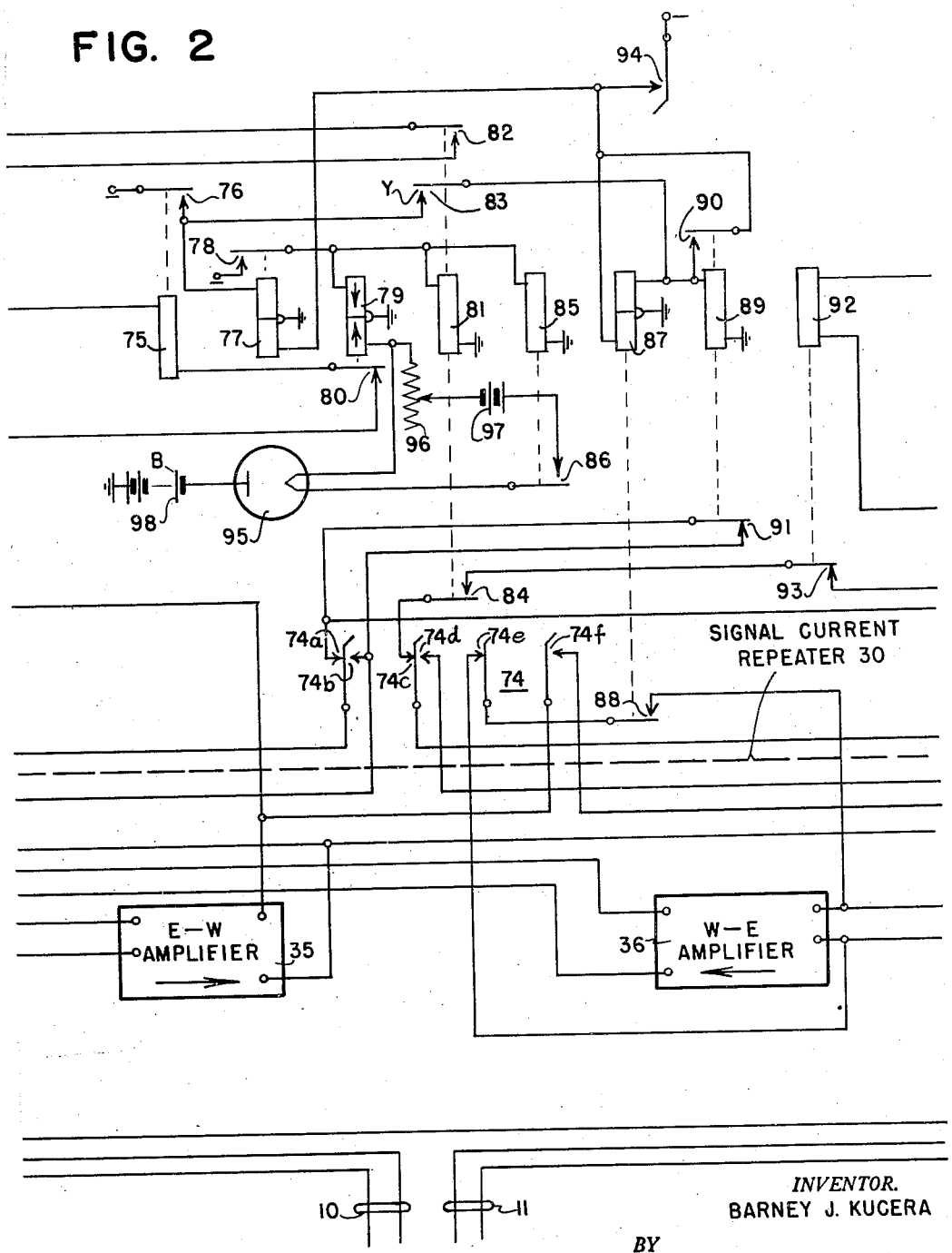
Figure 3:
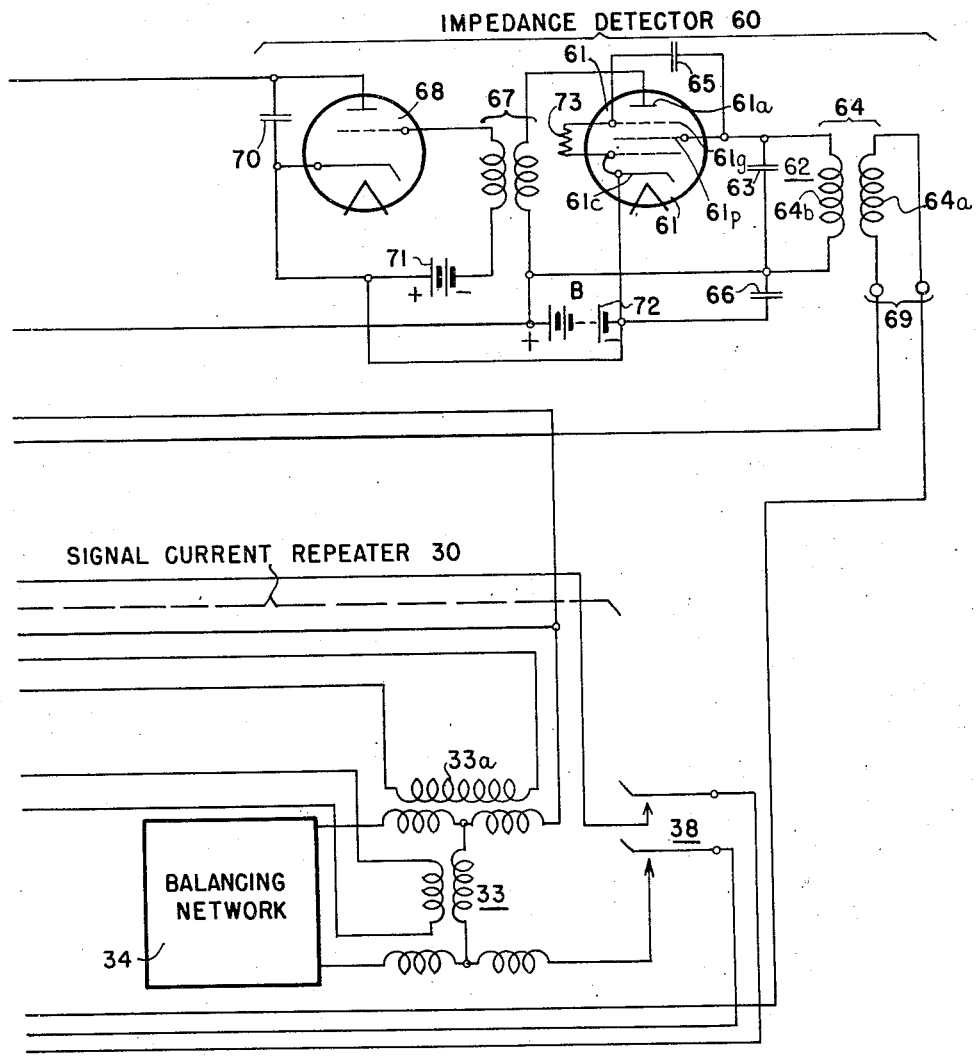
Figure 4:
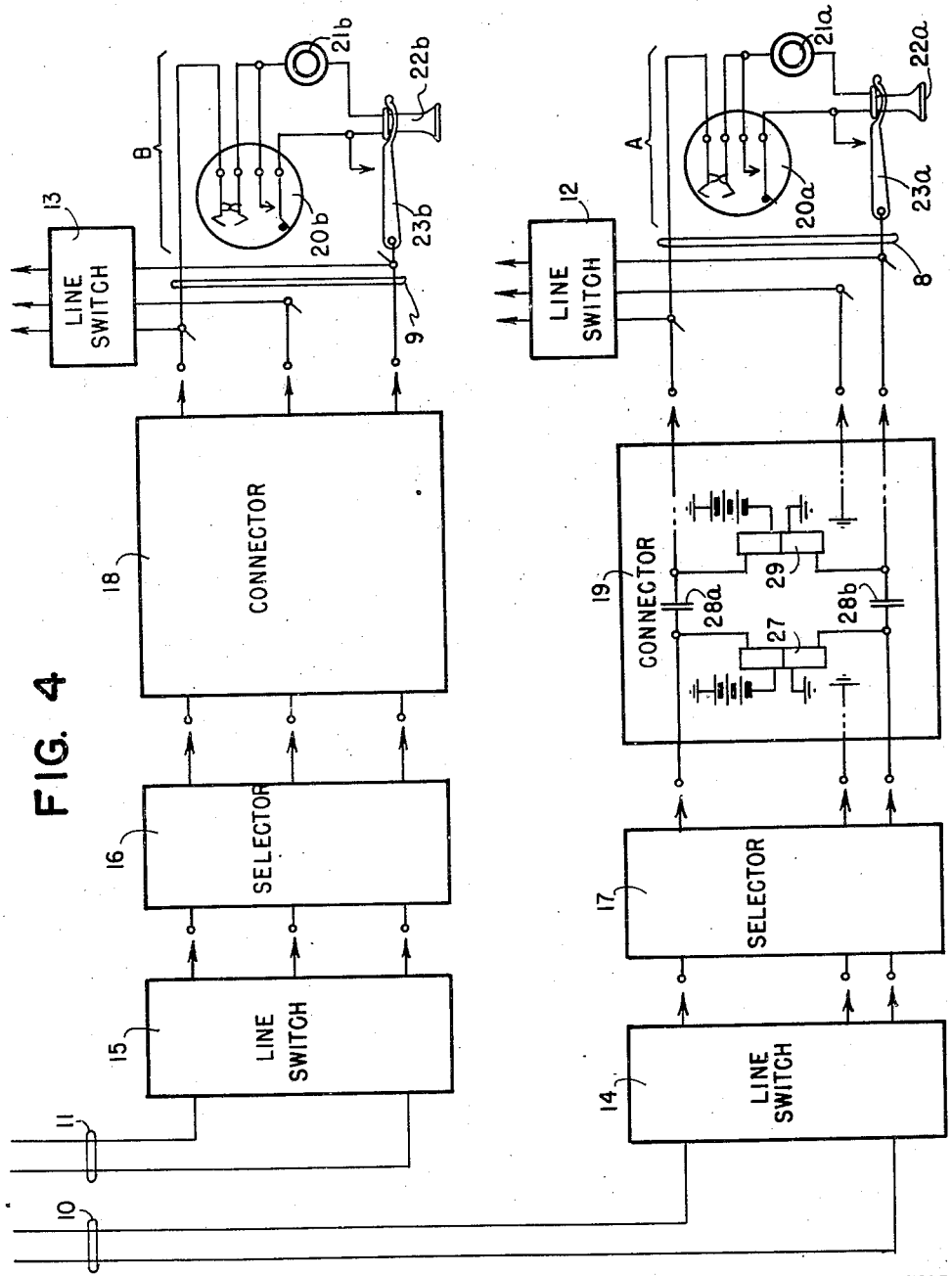
Figure 6:
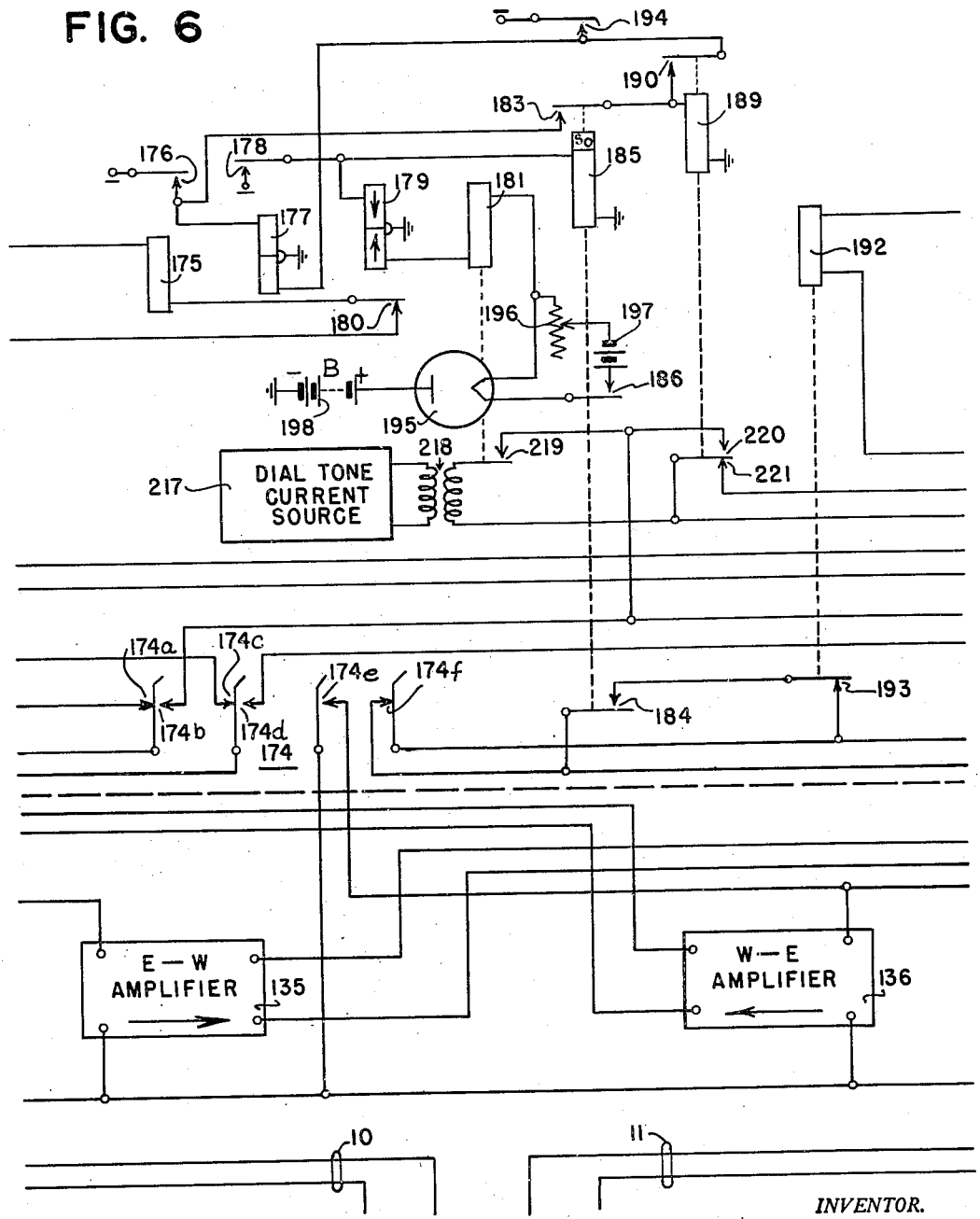

The invention, both as to its organization and method of operation, together with further objects and advantages thereof, will best be understood by reference to the specification taken in connection with the accompanying drawings in which Figs. 1, 2 and 3, when laid side by side in the order named and combined with Fig. 4, illustrate an improved system characterized by the features of the invention briefly outlined above; and Figs. 5, 6 and 7, when laid side by side in the order named and combined with Fig. 4, illustrate a modified arrangement of the system, also characterized by the features of the present invention.

Referring now more particularly to Figs. 1 to 4, inclusive, of the drawings, the improved observing apparatus is illustrated in its circuit relationship to the lines and automatic switching equipment of a thousand line automatic telephone system. More specifically, the call observing equipment, as provided at a particular point of observation, and illustrated in Figs. 1, 2 and 3 of the drawings, is connected to the automatic switching apparatus of the system as schematically shown in Fig. 4 of the drawings, by means of two lines 10 and 11 which respectively terminate in the exchange of the system in line switches 14 and 15. Two additional subscriber lines 8 and 9 are shown in the drawings as extending to the substations A and B, respectively. These lines also terminate in the exchange in line switches 12 and 13, respectively, through which access is gained to the impulse-controlled numerical switches of the exchange. More specifically, the impulse-controlled switching equipment of the exchange comprises a plurality of selectors 16, 17, etc., which are accessible to the line switches individual to the various lines and have access, in turn, to ten groups of connectors, two of which respectively include the connectors 18 and 19. Each group of connectors has access, in turn, to a particular group of one hundred lines.

It will be understood that the line switches 12, 13, 14 and 15 and the other similar switches of the system are non-numerical switches in the sense that they are ineffective to perform any line selecting function other than that of selecting an idle one of the selector switches. The selector and connector switches, on the other hand, are commonly known as numerical switches in that they are operative to perform particular line selecting functions in response to impulses transmitted thereto. Each of the line switches 12, 13, 14, 15, etc., is preferably of the well known rotary type, of which there are several commercial embodiments. Each of the selector and connector switches is preferably of the well known Strowger type having embodied therein a wiper carriage structure which is adapted to be translated vertically to bring the wipers thereof to a position opposite a particular level of bank contacts, and to then be rotated to bring the wipers into engagement with a particular set of bank contacts in a selected level; vertical, rotary and release magnets; and control relays suitably connected and arranged to control the energization of the various magnets and the line switching in accordance with the particular functions of the particular switch.

In order more easily to explain the operation of the circuits to which the present invention pertains, a portion of the equipment embodied in the connector 19 has been shown in detail. This connector is provided with a reactive talking bridge which, in the illustrated arrangement, comprises the two condensers 28a and 28b. These two condensers have the function of separating the calling and answering loop circuits included in a connection set up through the connector 19 in so far as direct currents are concerned, while at the same time providing a signal current channel through which signal currents may be transmitted between the two loop circuits. The connector 19 further conventionally comprises a line relay 27 having its windings bridged in series with the exchange battery across the talking conductors of the trunk incoming to the connector, and a back-bridge relay 29 having its windings adapted to be bridged in series with the exchange battery across the talking wipers of the connector. As thus connected, the windings of the two relays 27 and 29 are respectively included in the calling and answering loop circuits of a connection completed through the connector 19 between two lines of the system.

The substations served by the system are of the well known common battery type. Only a portion of this equipment as provided at the illustrated substations A and B is shown in the drawings. In brief, this equipment, as provided at each of the two substations, comprises a transmitter 21, a receiver 22, a calling device 20 of the dial-operated type, and a hook or cradle switch 23. It will be understood that each of the substations also includes a ringer bridged across the conductors of the associated line in series with a condenser, and an induction coil suitably connected in the circuit to provide the well known anti-side tone type of voice current transmission. In the interests of simplifying the disclosure, these elements have been omitted from the drawings.

In general, the call observing equipment as shown in Figs. 1, 2 and 3 of the drawings comprises a calling device 24 through operation of which calls may be routed from the point of observation through the automatic switching equipment to any desired substation of the system, an operator's headset 25 which conventionally includes a transmitter and receiver, and a dial and talk key 26 which may be used selectively to connect the calling device 24 and the headset 25 to the line 10. The equipment further comprises a signal current repeater 30 which may be connected between the two lines 10 and 11 through operation of the keys 37 and 38 and is operative to transmit signal currents between these two lines in either direction. Briefly considered, this repeater comprises terminal hybrid systems which respectively include the two hybrid coils 31 and 33 and two associated balancing networks 32 and 34. These hybrid systems are connected by an east-west signal current transmission channel which includes the schematically illustrated vacuum tube amplifier 35, and by a west-east signal current transmission channel which includes the schematically illustrated vacuum tube amplifier 36. It will be understood in this regard that the amplifier 35 as provided in the east-west channel between the two hybrid coils 31 and 33 is utilized to transmit signal currents from the line 10 to the line 11, and that the amplifier 36 as provided in the west-east channel connecting the hybrid coils 33 and 31 is utilized to transmit signal currents in the reverse direction, i. e., from the line 11 to the line 10.

In order to extend a connection from the observing point to a desired substation under the control of the calling device provided at a substation under observation, the control equipment illustrated in the upper portion of Figs. 1, 2 and 3 of the drawings is provided. In general, this equipment comprises a transient detector 40 of the thermionic type, an impedance detector 60 also of the thermionic type, and a group of control relays 75, 77, 79, 81, 85, 87, 89 and 92. Of the enumerated relays, those identified by the reference numerals 75, 81, 85, 89 and 92 are of the conventional single winding, fast-acting type. The double wound relay 79, on the other hand, is of the well known differential type, such that it will operate and remain operated when either of its two windings is energized but will restore when both of its windings are concurrently energized. Finally, the two relays 77 and 87 are provided with both operating and holding windings. More specifically, the lower winding of each of these relays may be preenergized without causing the relay to operate. When, however, the upper operating winding of either of these relays is subsequently energized to cause the operation thereof, normal rated current flow through the lower winding of the relay will serve to hold the relay in its operated position after the upper winding of the relay is deenergized. A key 94 is provided in the equipment to control the preenergization of the holding windings for the two relays 77 and 87 and to provide a locking circuit for the relay 89.

As will be apparent from the following detailed consideration of the disclosed circuits, the operation of the apparatus requires that the relay 79 be released a predetermined time interval after it is initially operated. For the purpose of measuring this time interval, a time delay device is provided. This device comprises a thermionic diode 95 having an output circuit which includes the lower winding of the differential relay 79 and a source of anode potential 98, and a cathode heating circuit which includes the current source 97 and an adjustable current limiting rheostat 96. For the purpose of disassociating the illustrated control equipment from a connection set up through the point of observation, after the functions assigned to this equipment have been discharged thereby, a key 74 of the well known locking type and having two operating positions is provided.

Referring now more particularly to the transient detector 40, it will be noted that this detector is arranged to control the relay 75 and that its input terminals are coupled to the output terminals of the channel amplifier 35 by means of the coupling condenser 48. This detector comprises a three-electrode transient amplifier tube 41 of the indirectly heated cathode type; a three-electrode control tube 42, also of the indirectly heated cathode type; and a full wave copper oxide rectifier 43 having its input terminals coupled to the output electrodes of the tube 42 through a coupling transformer 44 and its output terminals bridged by a condenser 45 having the function of controlling the operate and release periods of the relay 75. More specifically considered, the input electrodes 41g and 41c are coupled to the output terminals of the amplifier 35 through a resistance-capacitance coupling network which includes the resistor 47 and the condenser 48. A cathode biasing circuit 46 comprising the shunt-connected resistor 46a and condenser 46c is included in the output circuit of the tube 41 to provide the required normal bias voltage between the input electrodes 41c and 41g of the tube 41. The output electrodes 41a and 41c of the amplifier tube 41 are coupled to the input electrodes 42g and 42c of the control tube 42 through a resistance-capacitance network which includes the resistors 51 and 52 and the condenser 49. The normal bias between the input electrodes of the tube 42 is provided by a C battery 50 which is connected between these electrodes in series with the two resistors 51 and 52. This bias voltage may be increased under the control of the relay 81 by shunting the resistor 51 by an additional C battery 53 having its terminals so poled that the voltage thereof is added to the voltage of the battery 50. Anode voltage for the two tubes 41 and 42 is supplied by a current source 54 having its positive terminal connected to the anode 42a through the primary winding of the coupling transformer 44 and to the anode 41a through the inductance element 55.

The impedance detector 60, as shown in the upper portion of Fig. 3 of the drawings, comprises a thermionic audio-frequency oscillator employing the five-electrode oscillator tube 61, a rectifier which includes the three-electrode vacuum tube 68, and a pulsing relay 92 having its winding included in the output circuit of the rectifier tube 68. More specifically, the oscillator section of the detector 60 comprises a condenser 63 and the secondary winding 64b of a coupling transformer 64, which are shunt connected to form a frequency determining tank circuit. This tank circuit is coupled to the grid 61p and cathode 61c of the tube 61 through the by-pass condenser 66. The screen electrode 61g acts as the control grid of the oscillator and a portion of the oscillatory voltage developed across the tuned tank circuit is impressed on this grid through the condenser 65 and the inter-electrode capacitance between this electrode and the grid 61p. The potential difference between the control grid 61g and the cathode 61c of the tube, i. e., the bias on the grid 61g, is determined by the leak resistor 73 connected between these two elements. The output electrodes of the oscillator tube 61 are coupled to the input electrodes of the rectifier tube 68 by means of a coupling transformer 67. More particularly, the electron stream within the tube 61 and specifically that which extends to the anode 61a, as modulated by changes in the potential on the grid 61g, is used to couple the primary winding of the transformer 67 with the oscillatory portion of the tube circuit. Effectively, the arrangement just described is a tuned plate circuit oscillator, with the grid 61p acting as the anode and the screen electrode 61g acting as the control grid to indirectly produce changes in the electron stream in response to potential changes thereon. This arrangement, while capable of producing the requisite output voltage across the primary winding of the coupling transformer 67, is not capable of handling any substantial load. Accordingly, when the impedance across its input terminals 69 is altered to effectively increase the load imposed thereon, the oscillator immediately ceases to operate.

Anode potential for the two tubes 61 and 68 is supplied by a direct current source 72, the negative terminal of which is connected to the cathodes of the two tubes. The positive terminal of this source is connected to the anode of the tube 68 through the winding of the relay 92 and to the anode 61a through the primary winding of the transformer 67. It is also connected to the electrode 61p of the tube 61 through the secondary winding of the coupling transformer 64. The rectifier tube 68 is normally biased slightly beyond cut-off by the voltage of a C battery 71, which voltage is negatively applied to the control grid of the tube 68 through the secondary winding of the coupling transformer 67. Current for energizing the respective relays 77, 79, 81, 85, 87 and 89 may be derived from any suitable direct current source. The positive terminal of this source is connected to all terminals indicated by the ground symbol while the negative terminal thereof is connected to those terminals identified by the negative polarity sign. This source may also be used to energize the respective cathode heaters of the four tubes 41, 42, 61 and 68.

In considering the operation of the equipment thus far described, it may be assumed that an attendant at the point of observation desires to monitor all calls originating at the substation A. In order to condition the observing equipment for operation, the key 74 is operated to the position illustrated in the drawings, and the key 94 is actuated to its closed-circuit position to complete obvious circuits for energizing the respective holding windings of the two relays 77 and 87. After these key operations are completed, and in order to force all calls outgoing from the substation A to be routed by way of the point of observation, the attendant at this point must set up a connection to this substation. To this end the key 26 is thrown to its dial and talk position wherein the contacts 26a and 26b are respectively closed, and the calling device 24 is actuated in accordance with the digits of the directory number assigned to this substation. When the key 26 is thrown to its dial position, a loop circuit including the conductors of the line 10, the contacts 26a and 26b, and the pulsing springs of the calling device 24 is completed for energizing the line relay conventionally embodied in the line switch 14. In response to this operation, the line switch 14 functions in a well known manner to select an idle one of the selectors to which it has access. Assuming that the selector 17 is seized by the line switch 14, the loop circuit is extended to this selector to cause the line and hold relays embodied therein to operate and complete the usual dial tone signaling circuit, whereby a dial tone signal is produced by the receiver of the operator's headset 25. When this signal is received, the attendant may actuate the calling device 24 in accordance with the three digits of the directory number assigned to the desired substation A. Incident to the off-normal movement of the dial embodied in this device, the lower shunt springs thereof are closed to complete an obvious path for short-circuiting the operator's headset 25 in order to lower the resistance of the dialing circuit and to prevent the opening and closing of this circuit from producing clicks in the receiver of the headset. These springs are opened to interrupt the short-circuiting path each time the dial of the calling device is returned to normal. During each return movement of the dial, the upper pulsing springs of the calling device are opened and closed a number of times, determined by the numerical value of the digit dialed. In this regard it will be understood that the impulses of the first digit are utilized to elevate the wipers of the selector 17 to a position opposite the level of bank contacts through which access is gained to the connectors having access to the line 8. During the interdigit pause separating the first and second digits, these wipers are automatically rotated over the contacts of the selected level successively to test the connectors of the selected group until an idle connector is found therein. Assuming, for example, that the connector 19 is the first available connector of the group, operation of the selector 17 is arrested and the calling loop circuit is switched through to this connector when the wipers of the selector are positioned on the bank contacts terminating the conductors of the trunk incoming to this connector. Incident to this operation the windings of the line relay 27 are included in the calling loop circuit. After the connection has thus been extended to the connector 19 and when the final digits of the directory number assigned to the substation A are dialed, the wipers of this connector are positioned on the contacts terminating the conductors of the line 8. More specifically, the second digit as dialed into the connector 19 is utilized to elevate the wipers of this connector to a position opposite the level of bank contacts in which the conductors of the line 8 are terminated, while the third and final digit is used to rotate the connector wipers until they engage the particular bank contacts to which the conductors of the line 8 are connected. After the line 8 is thus selected it is tested in the connector 19 to determine the idle or busy condition thereof, and if busy the usual busy signal is transmitted over the calling loop circuit to energize the receiver of the operator's headset 25. If such a signal is received the attendant at the observation point may release the connection by restoring the key 26 to its normal position to open the calling loop circuit. If the called line 8 is idle at the time it is selected by the connector 19, the control equipment of this connector operates in an entirely conventional manner to transmit ringing current thereover for the purpose of energizing the ringer provided at the substation A. Incident to this operation, ground potential is applied to the private wiper of the connector for the purpose of marking the line 8 as busy to the other connectors and thus guarding this line against incoming calls from the other substations of the system. The desired conversational circuit between the observation point and the substation A is completed when the receiver 22a is removed from the supporting hook of the hook switch 23a. More specifically, when the contacts of this hook switch are closed, an answering loop circuit is completed which includes the winding of the ring cut-off relay conventionally embodied in the connector 19, the conductors of the line 8, the pulsing springs of the calling device 20a, the transmitter 21a, the receiver 22a and the contact springs of the hook switch 23a. In operating, the ring cut-off relay of the connector 19 operates to terminate the transmission of ringing current over the line 8 and to extend the answering loop circuit to include the windings of the back-bridge relay 29. Following these relay operations in the connector 19, the desired talking circuit is completed.

It will be understood that the attendant at the observation point must have a reasonable pretext for calling the substation A in order to prevent the answering party at this substation from suspecting the nature of the call. At the conclusion of the conversation, the attendant maintains the calling loop circuit closed in order to prevent the release of the operated switch train through which the connection extends. In this regard it it pointed out that the connector 19 is either of the last-party release or of the calling-party release type. With either type of connector the only operation resulting from the opening of the answering loop circuit at the substation A is that of deenergizing the back-bridge relay 29. Thus, following the release of the connection at the substation A, the line 8 extending thereto remains guarded against incoming calls and all calls initiated at this substation can only be extended over a route which includes the completed connection to the point of observation.

After the connection is thus set up between the observing point and the substation A, the attendant may operate the keys 37 and 38 to their closed-circuit positions, thereby to connect the conductors of the lines 10 and 11 to the terminals of the hybrid coils 31 and 33, respectively, and operatively to associate the control equipment with these lines. After the key 37 is operated to its closed-circuit position, two parallel direct current paths are bridged across the conductors of the line 10, one of these paths including the contacts 74a and 91 and the series-connected windings of the hybrid coil 31, and the other including the contacts 74a and the primary winding 64a of the coupling transformer 64. It will be appreciated that after these paths are closed, the dial and talk key 26 may be restored to normal without releasing the connection as set up through the switches 14, 17 and 19 to the line 8.

At this point, it is in order to comment briefly on the factors which are utilized in the control apparatus at the observation point to effect the extension of a connection to the desired substation. Briefly, these factors are the change in impedance produced across the input terminals 69 of the impedance detector 60 incident to the opening and closing of the answering loop circuit extending between the connector 19 and the substation A, and the transient voltages which are produced across the conductors of the line 10 in response to the opening and closing of the answering loop circuit. In this regard it will be understood that when the contacts of the hook switch 23a or the pulsing contacts of the calling device 20a are closed to complete the answering loop circuit, a voltage transient is produced across the conductors of the line 10 and appears across the line terminals of the hybrid coil 31, the terminals 69, and the terminals of the receiver in the operator's headset 25. This transient manifests itself as a click in the receiver of the operator's headset. Also incident to the closing of the answering loop circuit, the impedance of the overall signaling circuit as measured at the line terminals of the hybrid coil 31 and the input terminals 69 of the impedance detector 60 is substantially changed, assuming that the lines 8 and 10 are not unduly long. More specifically, this signaling circuit effectively comprises two links which are rather closely coupled through the condensers 28a and 28b of the connector talking bridge. Accordingly, when one of these links, i. e., that comprising the answering loop circuit, is effectively short-circuited through the substation equipment at the substation A, the impedance of the circuit as measured at the far end of the other link, i. e., across the line terminals of the hybrid coil 31 and the terminals 69, is substantially decreased.

Each time the answering loop circuit as completed between the connector 19 and the substation A is opened, either at the contact springs of the hook switch 23a or at the pulsing contacts of the calling device 20a, a voltage transient is produced across the conductors of the line 10 which is substantially greater in amplitude than that produced when the answering loop circuit is closed. In this case the counter electromotive force developed in the windings of the backbridge relay 29 is additively combined with the voltage of the exchange battery and impressed through the condensers 28a and 28b across the conductors of the line 10 and hence across the terminals of the hybrid coil 31 and the input terminals 69 of the impedance detector 60. Also, when the answering loop circuit is opened, the impedance of this loop circuit as reflected into the calling loop circuit is substantially increased, whereby the effective impedance of the overall signaling circuit as measured at the line terminals of the hybrid coil 31 and the input terminals 69 of the detector 60 is increased. So long as the line windings of the hybrid coil 31 are connected in shunt with the terminals 69 through the contacts 91, the low impedance of these windings sufficiently loads the oscillator section of the detector 60 to prevent oscillation thereof. When, however, the contacts 91 are opened to disconnect these windings from across the terminals 69, the operation of the oscillator circuit is controlled in accordance with the loading afforded by the impedance of the connection as measured at the terminals 69. Thus, the oscillator portion of the impedance detector 60 is only lightly loaded and hence rendered capable of oscillating during those periods when the answering loop circuit extending to the substation A is opened, but is rendered incapable of oscillating immediately the loop circuit connecting the substation A with the connector 19 is reclosed due to the increased load imposed thereon.

From the above explanation it will be understood that when a call is subsequently initiated at the substation A, a transient voltage appears between the conductors of the line 10, which is impressed upon the line terminals of the hybrid coil 31. This transient is transmitted through the windings of the hybrid coil 31, amplified by the channel amplifier 35, and impressed upon the input electrodes of the amplifier tube 41 through the condenser 48. The transient voltage is further amplified through the tube 41 and impressed across the input electrodes of the control tube 42 through the condenser 49. The resulting transient current flow in the output circuit of the tube 42 causes an induced alternating voltage of two oppositely poled half-cycles to be developed in the secondary winding of the coupling transformer 44 which is impressed upon the input terminals of the full wave rectifier 43. This voltage is rectified by the rectifier 43 and impressed across the winding of the relay 75 through the contacts 80.

When thus momentarily energized, the relay 75 closes its contacts 76 to complete an obvious circuit for energizing the relay 77. In operating, the relay 77 closes its contacts 78 to complete an obvious circuit for energizing the parallel-connected windings of the three relays 79, 81 and 85. It is noted that following the operation of the relay 77, the current traversing the lower or holding winding of this relay is sufficient to maintain the relay in its operated position after the relay 75 releases to deenergize its upper winding. It may be noted further that the condenser 45 as bridged across the output terminals of the rectifier 43 is utilized to sustain the energization of the relay 75 until the four relays 77, 79, 81 and 85 have completed their operation.

The relay 79, upon operating, opens its contacts 80 to deenergize the relay 75 and thus prevent the latter relay from responding to further transient voltages appearing across the conductors of the line 10 until such time as the relay 79 is deenergized. The relay 81, upon operating, closes its contacts 82 to connect the C battery 53 in shunt with the resistor 51 and thereby increase the negative bias on the control grid 42g of the tube 42 to a value substantially beyond the point of anode current cut-off. Thus the transient detector 40 is prevented from passing transient voltages of small amplitude that may appear across the conductors of the line 10. More specifically, the magnitude of the bias voltage impressed between the input electrodes of the tube 42 is, following operation of the relay 81, sufficient to prevent the transient detector from transmitting any transient voltage except one equal to or greater than that produced by opening the loop circuit which connects the connector 19 with the substation A.

In operating, the relay 81 also closes its contacts 84 to complete a loop circuit between the point of observation and the line switch 15. This circuit includes the conductors of the line 11, the contacts of the key 38, the series-connected line windings of the hybrid coil 33, and the contacts 93, 84 and 74c. In operating, the relay 81 also closes its contacts 83 to prepare a circuit for energizing the parallel-connected windings of the relays 87 and 89. It is noted in this regard that the relay 81 is so adjusted that the contacts 83 thereof are the last to close and are only engaged after the relay 75 has released to open its contacts 76. Thus the relays 87 and 89 are prevented from operating in response to the initial operation of the relay 75.

When the above-described loop circuit is completed by way of the line 11 to the line switch 15, this line switch operates to extend the circuit to the first idle selector to which it has access. Assuming that the selector 16 is seized through the line switch 15, the calling loop circuit is extended thereto and the control equipment of this selector is operated to complete the usual dial tone signaling circuit. The signal voltage thus impressed across the conductors of the line 11 is transmitted through the hybrid coil 33, amplified by the west-east channel amplifier 36, and transmitted through the hybrid coil 31 to be impressed upon the conductors of the line 10. From this point the signal current is transmitted over the connection established between the observing point and the substation A to energize the receiver 22a and thus inform the calling party at this substation that the dialing operation may be started.

Incident to the extension of the connection from the observation point through the line switch 15 to the selector 16, at least two line switching operations are performed in these two switches, which result in transient voltages appearing across the conductors of the line 11. Such voltages together with the dial tone signal voltage are transmitted through the hybrid coil 33 and the amplifier 36 to the hybrid coil 31. If the impedance of the balancing network 32 exactly matches the line impedance as measured between the line terminals of the hybrid coil 31, these voltages are not impressed upon the input terminals of the amplifier 35. In practice, however, a precise matching of the two indicated impedances is seldom if ever obtained, with the result that a certain amount of unbalance of the hybrid system, representing a certain amount of coupling between the west-east channel and the east-west channel, obtains. Accordingly, portions of the above-noted transient and signal voltages are transmitted through the hybrid coil 31, amplified by the amplifier 35 and impressed upon the input electrodes of the transient detector 40. Since, however, the relay 79 is operated during the interval required to extend the connection from the observation point over the line 11 to the selector 16 in the manner just explained, it will be understood that if the transient voltages produced incident to the extension of the connection and transmitted to the input side of the transient detector 40 are passed through this detector, the relay 75 is prevented from operating. Thus, so long as the relay 79 is operated the operating circuit for the relay 75 is held open at the contacts 80.

After a predetermined time interval just exceeding that required to extend the connection to the selector 16, the relay 79 is caused to release to reprepare the circuit for energizing the relay 75. Thus, when the relay 85 operates in the manner explained above, it closes its contacts 86 to complete a circuit including the battery 97 and the encircuited resistance of the rheostat 96 for energizing the cathode of the diode 95. After a short time interval required for the cathode of this tube to be heated to its electron emitting temperature, current derived from the source 98 is passed through the space current path of this tube to energize the lower winding of the relay 79. When both of its windings are thus energized, this relay releases and closes its contacts 80 to reprepare the circuit for energizing the relay 75. It will be understood from the above explanation that the time interval during which the relay 79 is operated is determined entirely by the setting of the rheostat 96 to fix the period required for the cathode of the diode 95 to be heated to its electron emitting temperature. Preferably, this rheostat is so adjusted that the indicated time interval only slightly exceeds that period which is required for a connection to be extended through a line switch to a selector. This period may be of the order of one or two seconds.

After the relay 79 releases, the relay 75 is rendered responsive to any transient or signal voltage that may be incidentally transmitted through the detector 40. The purpose of utilizing the relay 81 to increase the negative bias voltage upon the control grid 42g of the control tube 42 in the manner explained above now becomes apparent. Thus by increasing this voltage the transient detector 40 is rendered incapable of passing the dial tone signal voltage and such incidental transient voltages as may be impressed upon the input terminals thereof. Accordingly, false operation of the relay 75 is prevented. The above-noted transient and signal voltages produced across the line terminals of the hybrid coil 31 incident to the extension of a connection from the observation point to the selector 16, are also directly impressed across the input terminals 69 of the impedance detector 60. As previously stated, however, with the line windings of the hybrid coil 31 bridged across these terminals, the oscillator portion of the impedance detector 60 is prevented from operating. Accordingly, the transient and signal voltages appearing across the input terminals 69 of this detector are prevented from causing false operation of the pulsing relay 92.

When the dial tone signal is received at the substation A, the calling party may actuate the dial of the calling device 20a in accordance with the digits of the directory number designating the desired substation. For purposes of explanation it may be assumed that the substation B is desired by the calling party. When the dial of the calling device 20a is moved off normal at the start of each dialing operation, the lower shunt springs of this device are closed to complete an obvious path for short-circuiting the transmitter 21a and the receiver 22a, thereby to lower the resistance of the loop circuit connecting the substation A with the connector 19, and to prevent the transmitted impulses from being reproduced as clicks by the receiver 22a. These shunt springs are obviously opened to interrupt the short-circuiting path each time the dial of the calling device 20a is returned to its normal position. During each return movement of this dial, the upper pulsing springs of the calling device 20a are opened and closed a number of times to transmit a corresponding number of impulses over the line 8. These impulses are followed by the back-bridge relay 29. In this regard it will be understood that each time the impulsing springs of the calling device 20a are opened, a transient voltage of rather large amplitude is produced between the conductors of the line 10, and the impedance of the connection as set up between the substation A and the observation point, and as measured across the input terminals 69 of the impedance detector 60, is substantially increased. It will also be understood that each time the pulsing springs of the calling device 20a are closed at the end of the open-circuit period of an impulse, a transient voltage of lesser magnitude is produced across the conductors of the line 10 and the impedance between the input terminals 69 of the impedance detector 60 is substantially decreased.

The transient voltage produced between the conductors of the line 10 at the beginning of the open-circuit period of the first impulse of the first digit dialed at the substation A, is transmitted through the hybrid coil 31, amplified by the channel amplifier 35 and impressed across the input electrodes of the amplifier tube 41. This voltage as amplified through the tube 41 is impressed between the input electrodes of the control tube 42 and is of sufficient amplitude to overcome the negative bias afforded by the bias batteries 50 and 53. Thus the transient is passed to the output circuit of the tube 42 and transmitted through the rectifier 43 to cause the reoperation of the relay 75. Upon operating the second time, the relay 75 closes its contacts 76 to again energize the upper winding of the relay 77 and to complete a circuit through the contacts 83 for energizing the parallel-connected windings of the two relays 87 and 89. The relay 89, upon operating, locks up in a circuit which includes the contacts 90 and the contacts of the switch 94. At its contacts 91, the relay 89 opens the path over which the line windings of the hybrid coil 31 are bridged across the conductors of the line 10 and across the input terminals 69 of the impedance detector 60. It will be observed that after this path is opened the transient or signal voltages thereafter appearing across the conductors of the line 10 cannot be transmitted through the hybrid coil 31 and the amplifier 35 to the input terminals of the transient detector 40. Moreover, with this path opened, the low impedance presented by the line windings of the hybrid coil 31 is no longer connected in shunt with the input terminals 69 of the impedance detector 60 to interfere with the response of this detector to changes in the impedance of the signaling circuit afforded by the continued operation of the pulsing springs in the calling device 20a.

After the relay 87 is operated, it will, by virtue of the continued energization of its lower winding, remain operated after its upper winding is deenergized. This relay, in operating, closes its contacts 88 to complete a path through the contacts 74e for short-circuiting the input terminals of the west-east channel amplifier 36. The short-circuiting of these terminals prevents transient voltages appearing across the conductors of the line 11, and produced incident to the extension of the connection to the desired substation B, from being transmitted through the hybrid coil 33, the amplifier 36, the unbalanced hybrid system including the hybrid coil 31 and the amplifier 35 to the input terminals of the transient detector 40. Thus this detector is prevented from falsely responding to those transient voltages produced on the line 11 incident to the extension of the connection. More generally considered, it will be noted that following the operation of the two relays 87 and 89, the signal current repeater 30 is rendered completely inactive to transmit signal and transient voltages therethrough in either direction. Thus, the transient detector 40 is rendered completely inactive and the dial tone signal transmitted through the repeater 30 in response to the first operation of the relay 75 is terminated.

When the impedance across the terminals 69 is increased in the manner just explained, operation of the oscillator section of the impedance detector 60 is initiated. The oscillatory voltage produced across the output circuit of the tube 61 is transmitted to the input circuit of the rectifier tube 68 and alternate half-cycles thereof are passed through the winding of the pulsing relay 92. This current is smoothed through the action of the condenser 70 so that the relay 92 is effectively energized by a uni-directional current. Immediately this relay is energized it opens its contacts 93 to interrupt the loop circuit as extended by way of the line 11 and the line switch 15 to the selector 16.

At the end of the open-circuit period of the first impulse dialed at the substation A, the impedance across the input terminals 69 of the impedance detector 60 is substantially decreased with the result that the oscillator section of the impedance detector 60 stops oscillating to terminate the current flow through the winding of the pulsing relay 92. This relay, in releasing, recloses its contacts 93 to recomplete the loop circuit extending to the selector 16 and thus complete the impulse transmitted to this selector. The response of the impedance detector 60 to the other impulses transmitted to the observation point through continued operation of the calling device 20a is exactly the same as just explained. In this regard it will be understood that the impulses of the first digit as repeated to the selector 16 are utilized in this selector to extend the connection to a connector, such, for example, as the connector 18 having access to the desired line 9. Following the switch-through operation of the selector 16 and during the inter-digit pause between the first and second digits, the connector 18, for example, is seized and conditioned for operation. The impulses of the second and third digits, as repeated to the connector 18 through operation of the impedance detector 60 and the pulsing relay 92, are utilized to position the wipers of this connector on the contacts terminating the conductors of the line 9. After this line is selected it is tested in the usual manner to determine the idle or busy condition thereof, and, if busy, the usual busy signal is returned over the line 11. On the other hand, if the line 9 tests idle, ringing current is transmitted thereover to energize the ringer provided at the substation B and the usual ring-back tone signal is returned over the line 11.

The attendant at the point of observation may, by retaining the key 26 in its dial and talk position, monitor the dialing operation to determine when this operation is completed. In this regard it will be understood that each impulse transmitted by the calling device 20a produces two transient voltages across the conductors of the line 10, which are reproduced as clicks by the receiver of the operator's headset 25. Accordingly the attendant, upon observing that the clicks have stopped, is informed that the dialing operation is completed. Immediately after the dialing operation is completed, the key 74 may be actuated from its illustrated normal position to an off-normal position wherein the contacts 74a, 74c and 74e thereof are respectively disengaged, and the contacts 74b, 74d and 74f are respectively engaged. At the contacts 74a, the path for bridging the input terminals 69 of the impedance detector 60 across the conductors of the line 10 is opened, thereby to render this detector wholly inactive. At the contacts 74b, the line windings of the hybrid coil 31 are again bridged across the conductors of the line 10. At the contacts 74c and 74d, the loop circuit extending from the point of observation to the connector 18 is rearranged so that the relay contacts 84 and 93 are excluded therefrom. At the contacts 74e, the path short-circuiting the input terminals of the amplifier 36 is opened, thereby to render the signal current repeater 30 operative to transmit signal voltages from the line 11 to the line 10. At the contacts 74f, the output terminals of the other channel amplifier 35 are bridged across the transmitting winding 33a of the hybrid coil 33, thereby to render the signal current repeater 30 operative to transmit signal voltages from the line 10 to the line 11. Incident to the last-mentioned operation, the transmitting winding 33a of the hybrid coil 33 is effectively shunted across the input terminals of the transient detector 40, thereby to render this detector substantially non-responsive to signal and transient voltages appearing across the output terminals of the amplifier 35. Following the operations just described, the connection as set up between the substation A and the connector 18 is fully conditioned to transmit signal and voice frequency currents in either direction. Thus the busy or ring-back tone signal voltage impressed upon the line 11 in the connector 18, incident to the operation of this connector to test the line 9, is returned over the line 11 through the repeater 30 and over the connection set up between the observation point and the substation A to energize the receiver 22a, whereby the calling party is informed either that the desired line is busy or that the called substation is being rung. The attendant at the observation point also receives this information, assuming that the key 26 is retained in its dial and talk position wherein the operator's headset 25 is bridged across the conductors of the line 10.

If the call is answered at the called substation B the control equipment of the connector 18 operates in an entirely conventional manner to arrest the ringing operation and to complete a talking circuit between the lines 9 and 11 and, hence, between the substations A and B. In this regard it will be understood that signal currents produced through operation of the transmitter 21b are transmitted to the receiver 22a over a channel which includes the line 9, the connector 18, the selector 16, the line switch 15, the line 11, the hybrid coil 33, the west-east amplifier 36, the hybrid coil 31, the line 10, the line switch 14, the selector 17, the connector 19, and the line 8. Signal currents produced through operation of the transmitter 21a, on the other hand, are transmitted to the receiver 22b over a circuit which includes the line 8, the connector 19, the selector 17, the line switch 14, the line 10, the hybrid coil 31, the east-west amplifier 35, the hybrid coil 33, the line 11, the line switch 15, the selector 16, the connector 18, and the line 9. So long as the operator's headset 25 is bridged across the conductors of the line 10, the attendant at the observation point may, of course, monitor or listen in on the conversation held between the calling party at the substation A and the called party at the substation B.

After the conversation is terminated and the connection is released at both the calling and called ends thereof, the attendant may release the switch train through which the connection is extended to the substation B by actuating the key 38 to its open-circuit position to interrupt the loop circuit as set up between the point of observation and the connector 16. When this loop circuit is opened the connector 18, the selector 16 and the line switch 15 are restored to normal in a manner well understood in the art. In this regard it will be understood that if the attendant at the point of observation desires to release the connection as set up to the substation A under observation, the key 26 may be returned to normal and the key 37 operated to its open-circuit position, thereby to interrupt the loop circuit as set up between the observing equipment and the connector 19. When this loop circuit is opened the connector 19, the selector 17 and the line switch 14 are successively released in the usual manner. Incident to the release of the connector 19, the private conductor of the line 8 is disconnected from ground to render this line accessible to the other connectors of the system.

In the event the call as initiated at the substation A is abandoned at this substation before it is fully extended to the desired substation B, the signal voltage produced through operation of the oscillator section of the impedance detector 60 is transmitted to the receiver of the operator's headset 25 to inform the attendant of the abandonment of the call. Thus when the calling party restores the receiver 22a to the supporting hook of the hook switch 23a to open the loop circuit extending between the substation A and the connector 19, operation of the oscillator section of the impedance detector 60 is initiated in the manner explained above. A portion of the oscillatory voltage appearing across the tuned tank circuit of this device is transmitted through the transformer windings 64a, the contacts 74a, and the contacts of the two keys 37 and 26 to the receiver of the operator's headset 25. This signal is of audio frequency and, as reproduced by the receiver of the operator's headset, produces a distinctive signal which indicates that the initiated call has been abandoned. Upon receiving this signal, the operator may release the connection as extended over the line 11 by operating the key 38 to interrupt the loop circuit established by way of this line. The manner in which the switches occupied with the call are released when this loop circuit is broken will be clearly apparent from the above explanation.

In order to condition the observing equipment for use in handling another call after a connection has been partially or completely extended from this equipment to a called substation and then released, the key 38 is returned to its closed-circuit position, the key 74 is returned to the illustrated normal position thereof, and the key 94 is momentarily operated to its open-circuit position. In response to the latter operation the parallel-connected windings of the three relays 77, 87 and 89 are deenergized, causing all three of these relays to restore. In releasing, the relay 77 opens its contacts 78 to deenergize the two relays 81 and 85 and the upper winding of the relay 79, thus causing the latter relay momentarily to reoperate. The relay 85, upon restoring, opens its contacts 86 to deenergize the cathode of the diode 95. When this cathode has cooled for a short time interval, space current flow therethrough is arrested to deenergize the lower winding of the relay 79, causing this relay to restore. After the relays 75, 87 and 89 have released, the key 94 may be returned to its closed-circuit position in order to again energize the holding windings of the two relays 77 and 87. Following the operations just described the observing equipment is fully restored to normal and is conditioned to handle another call originating at the observed substation A or at another substation which may be placed under observation in the manner explained above.

Referring now more particularly to Figs. 5, 6 and 7 of the drawings, the call observing equipment there illustrated is substantially similar in circuit arrangement to that shown in Figs. 1, 2 and 3 of the drawings and described above. Accordingly, corresponding parts of the two different circuit arrangements have been identified by reference numerals differing only in the hundreds digit thereof. For convenience in describing the circuits involved, the observing equipment as illustrated in Figs. 5, 6 and 7 of the drawings is shown as being connected to the two lines 10 and 11 which may extend to the line switches 14 and 15 of the automatic switching apparatus shown in Fig. 4 of the drawings. In general, this equipment differs from that shown in Figs. 1, 2 and 3 in the provision of a repeating coil 222 which is inserted in the channel connecting the conductors of the line 10 with the input sides of the impedance detector 160 and the transient detector 140. A balancing network comprising the condenser 224 and the resistor 223 is connected across one set of terminals of this coil in order to balance the impedance of a connection extending to the line terminals of the coil. Facilities are also provided in the modified arrangement for transmitting dial tone signaling current through the repeating coil 222 to the line 10, and thence to a substation that has been placed under observation. These facilities include a dial tone current source 217 having its output terminals coupled to the dial tone signaling circuit. This signaling circuit is arranged to be directly controlled by the relays 181 and 189 of the control relay network, in a manner such that the dial tone signal is only transmitted after a connection has been extended from the observing equipment to the first selector of a switch train. The purpose of this arrangement is to provide more positive control of the dial tone signal transmission and to prevent the signal voltage from producing false operation of the impedance detector 160 or the transient detector 140. A further change which has been incorporated in the apparatus shown in Figs. 5, 6 and 7 of the drawings pertains to the wiring of the keys 137 and 174. It will be noted that the contacts of these keys are so wired that the conductors of the line 10 may be connected either to the input terminals of the repeating coil 222 or the input terminals to the hybrid coil 131 but not to both sets of terminals at the same time. By virtue of these changes, it is unnecessary to provide facilities for preventing the transmission of transient and signal voltages to the transient detector 140 and the impedance detector 160 during the extension of a connection from the apparatus to a called substation.

Another change which has been incorporated in the observing equipment shown in Figs. 5, 6 and 7 of the drawings relates to the arrangement of the transient detector 140. Briefly considered, this detector comprises a push-push connected amplifier stage including the two parallel-connected tubes 201 and 202; a control stage including the two parallel-connected tubes 204 and 205 which are coupled through the transformer 203 to the output electrodes of the amplifier tubes 201 and 202; and a direct current amplifier comprising the two parallel-connected tubes 208 and 209 which are resistance-coupled through the resistors 206 and 207 to the output electrodes of the tubes 204 and 205. A leak resistor 213 shunted by a condenser 214 is included in the path connecting the cathodes and control grids of the tubes 204 and 205 for the purpose of limiting the extent to which the grids of these tubes may be driven positive with respect to their respective associated cathodes. The input electrodes of the first amplifier stage are coupled to the terminals 226 of the repeating coil 222 through a coupling transformer 200 and a pair of coupling condensers 210 and 211. A battery 212 is provided for normally biasing the control grids of the two tubes 201 and 202 substantially to the point of anode current cut-off. Anode current for the six tubes of the detector 140 is supplied from a direct current source 215 which is tapped at a point 216 therealong so that the required difference of potential exists between the cathode and control grid of each of the two direct current amplifier tubes 208 and 209. In this regard it will be noted that the normal bias on the grids of the two tubes 208 and 209 is determined by the oppositely directed current flow through the balanced resistors 206 and 207 and the space current paths of the tubes 204 and 205. The latter tubes normally operate with zero bias on their grids so that substantial currents traverse the resistors 206 and 207. These currents are obviously in such directions that the resulting voltage drops across the resistors 206 and 207 are negatively applied to the grids of the tubes 208 and 209 in opposition to the positive bias voltage provided by the section 216a of the battery 215. The circuit constants are so adjusted that the net bias voltage as applied to the control grid of each of the tubes 208 and 209 is sufficiently negative to maintain the normal space current flow through the winding of the relay 175 substantially below the value required to operate this relay. Current for energizing the relays 177, 179, 185 and 189, and the cathode heaters of the tubes 201, 202, 204, 205, 208, 209, 168 and 165 may be supplied by any direct current source of suitable voltage.

In considering the operation of the equipment shown in Figs. 5, 6 and 7 of the drawings, it may be assumed that this equipment is operatively associated with the automatic switching apparatus shown in Fig. 4 of the drawings; that calls originating at the substation A are to be observed; that the calling device 124 provided at the point of observation is utilized to direct a connection through the switches 14, 17 and 19 to the substation A; and that the connection is held from the point of observation after it is released at this substation. After this connection is completed, the control portion of the apparatus may be conditioned to extend a connection over the line 11 to a desired substation by operating the two keys 137 and 138 to their closed-circuit positions; operating the key 174 to its off-normal position wherein the contacts 174b, 174d and 174e thereof are respectively engaged and the contacts 174a, 174c and 174f thereof are respectively disengaged; and operating the key 194 to its closed-circuit position to prepare a locking circuit for the relay 189 and to complete an obvious circuit for energizing the holding winding of the relay 177. With the key 174 operated to its off-normal position, the contacts 174a and 174c thereof are respectively disengaged so that the line terminals of the hybrid coil 131 are disconnected from the conductors of the line 10. Also, with the contacts 174e of this key closed, an obvious path is completed for short-circuiting the input terminals of the west-east channel amplifier 136, thereby to prevent the signal current repeater 130 from singing.

With the apparatus thus conditioned for operation, a transient voltage is produced between the conductors of the line 10 when a call is subsequently initiated at the substation A. This voltage is impressed upon the input circuit of the transient detector 140 over a channel which includes the contacts of the key 137, the contacts 174b and 174d, the repeating coil windings 222c and 222d, and the condensers 210 and 211, and appears in the secondary winding of the coupling transformer 200 as an alternating voltage having a positive half-cycle and a negative half-cycle. After amplification through the amplifier stage comprising the two parallel-connected tubes 201 and 202, this voltage appears as an induced voltage in the secondary winding of the coupling transformer 203. During one half-cycle of the amplified voltage the grid of one of the two tubes, such, for example, as the tube 204, is driven negative with respect to its associated cathode, thereby to cause a sharp decrease in the magnitude of the space current flow through the resistor 206 and, hence, in the voltage drop across this resistor. Thus the negative bias applied to the control grid of the direct current amplifier tube 208 is sharply decreased to produce a substantial increase in the space current flow through this tube and, hence, through the winding of the relay 175. Coincident with the current changes just described, and during the same half-cycle of the voltage induced in the secondary winding of the transformer 203, the control grid of the tube 205 is driven positive with respect to its associated cathode, to produce an increase in the current flow through the coupling resistor 207. The extent to which the control grid of the tube 205 is driven positive with respect to its associated cathode is limited by the action of the leak resistor 213 in a well known manner. Accordingly, the increase in space current flow through the tube 205 is limited not to exceed a predetermined value. It will be understood, moreover, that since the change in space current flow through this tube is manifested at a point along the upper flat portion of the tube characteristic, only a small increase in current flow through this tube, and hence in the bias voltage across the coupling resistor 207, is produced. This small increase in bias voltage across the resistor 207 is manifested as a decrease in the space current flow through the tube 209 and, hence, through the winding of the relay 175. It is noted, however, that the sharp increase in current flow through the tube 208 substantially exceeds the decrease in current flow through the tube 209, and that the resulting net increase in current flow through the winding of the relay 175 is sufficient to cause the operation of this relay.

During the other half-cycle of the alternating voltage induced in the secondary winding of the coupling transformer 203 as a result of the transient voltage appearing across the conductors of the line 10, the potentials on the grids of the tubes 204 and 205 are controlled to produce a sharp decrease in space current flow through the tube 205 and a relative small increase in space current flow through the tube 204. As a result the space current flow through the tube 208 is decreased slightly and that through the tube 209 is sharply increased. The net increase in current flow through the winding of the relay 175 is sufficient to maintain this relay in its operated position. It will thus be understood that the relay 175 is held operated during both halves of the transient voltage appearing across the conductors of the line 10.

In operating, the relay 175 closes its contacts 176 to complete an obvious circuit for energizing the operating winding of the relay 177. After the latter relay has operated it will remain in its operated position until its holding winding is deenergized. In operating, the relay 177 closes its contacts 178 to complete an obvious circuit for energizing the upper winding of the relay 179 in parallel with the winding of the relay 185. The relay 179, upon operating, opens its contacts 180 to deenergize the relay 175, providing the latter relay is still in its operated position. After the relay 175 restores, the slow-to-operate relay 185 closes its contacts 183 to prepare the operating circuit for the relay 189. At its contacts 186, the relay 185 completes an obvious circuit for energizing the cathode of the diode 195.

In operating, the relay 185 also closes its contacts 184 to complete a loop circuit to the line switch 15. This circuit includes the conductors of the line 11, the contacts of the key 138, the line windings of the hybrid coil 133, and the contacts 193. When this loop circuit is completed, the line switch 15 operates to extend the connection to the first idle selector to which it has access. Assuming that the selector 16 is seized through the outlet contacts of the line switch 15, the calling loop circuit is extended thereto and the control equipment of this selector is conditioned to respond to receive current impulses in the usual manner. Incident to the extension of the connection through the line switch 15 to the selector 16, at least two line switching operations are performed which result in transient voltages appearing across the conductors of the line 11. Such voltages are transmitted through the hybrid coil 133 to the input terminals of the west-east channel amplifier 136. Since the input terminals of this amplifier are short-circuited through the contacts 174e of the key 174, the transient voltages are not transmitted therethrough.

During the time interval required for the above-described switching operations to be performed, the cathode of the diode 195 is energized from the current source 197 through the rheostat 196. After a short time interval required for the cathode of this tube to be heated to its electron emitting temperature, current derived from the source 198 is passed through the space current path of this tube to energize the relay 181 in series with the lower winding of the relay 179. When both of its windings are thus energized, the relay 179 releases and closes its contacts 180 to reprepare the circuit for energizing the relay 175. It will be understood from the above explanation that the time interval during which the relay 179 remains operated is determined entirely by the setting of the rheostat 196 to fix the period required for the cathode of the diode to be heated to its electron emitting temperature. Preferably, this rheostat is so adjusted that the measured time interval only slightly exceeds the period required for a connection to be extended from the line 11 through the line switch 15 to the selector 16.

When energized through the space current path of the diode 195, the relay 181 closes its contacts 219 to complete a circuit including the windings of the repeating coil 222, the contacts 174b and 174d of the key 174, and the contacts of the key 137 for transmitting signal current from the source 217 to the line 10. From this point the dial tone signal current is transmitted over the line 10 and through the tandem-connected switches 14, 17 and 19 to energize the receiver 22a provided at the substation A and thus signal the calling party that the dialing operation may be started. It is noted that the constants of the balancing network comprising the condenser 224 and the resistor 223 are proportioned substantially to balance the impedance of the connection as set up between the observation point and the substation A. With this in mind, it will be understood from a brief analysis of the circuits traversed by the signal current, that the dial tone signal voltage appearing across the terminals 226 of the repeating coil 222 is substantially negligible. Thus the transmission of the dial tone signal to the substation A is prevented from incidentally producing a voltage across the input terminals of the impedance detector 160 and the transient detector 140 of sufficient magnitude to cause the false operation of either of the two relays 175 and 192.

When the dial tone signal is received at the substation A, the calling party may actuate the dial of the calling device 20a in accordance with the digits of the directory number designating the desired substation. When the calling device 20a is operated to transmit the open-circuit period of the first impulse, a transient voltage is produced between the conductors of the line 10 and impressed across the input terminals of the transient detector 140 to cause the reoperation of the relay 175 in the manner explained above. In reoperating, the relay 175 closes its contacts 176 to complete the prepared operating circuit for the relay 189. The latter relay, in operating, locks up in a circuit which includes the contacts 190 and the contacts of the key 194. At its contacts 220, the relay 189 short-circuits the secondary winding of the dial tone transformer 218, thereby to terminate the dial tone signal being transmitted over the line 10. At its contacts 221, the relay 189 opens the path over which the balancing network comprising the condenser 224 and the resistor 223 is bridged between the outer terminals of the repeating coil windings 222a and 222b, thereby to prevent the oscillator section of the impedance detector 160 from being loaded by the impedance through these two circuit elements. In this regard it will be understood that so long as the parallel-connected elements 223 and 224 are connected in series with the windings 222a and 222b across the primary winding of the coupling transformer 164, the oscillator section of the detector 160 is too heavily loaded to oscillate, regardless of the impedance of the connection as set up to the substation A. After the relay 189 is energized, the impedance across the input terminals of the coupling transformer 164 is, however, primarily determined by the impedance of the connection as set up between the observation point and the substation A. This impedance, it will be recalled, is sharply varied to correspondingly vary the loading of the oscillator section of the impedance detector 160, as the loop circuit extending between the connector 19 and the substation A is opened and closed during each impulse transmitted through operation of the calling device 20a.

The manner in which the impedance detector 160 responds to the impedance changes produced across the input terminals thereof incident to the operation of the calling device 20a is exactly the same as explained above with reference to the operation of the impedance detector 60 shown in Fig. 3 of the drawings. From this explanation it will be understood that the pulsing relay 192 functions to repeat each impulse dialed at the substation A to the line 11. The first series of impulses, i.e., those of the first digit, are utilized in the seized selector 16 to extend the connection from the line 11 to a connector, such, for example, as the connector 18 having access to the line desired by the calling party. For explanatory purposes it may again be assumed that the substation B is desired by the party using the substation A. During the inter-digit pause between the first and second digits, the selector 16 operates to switch the calling loop circuit through to the connector 18, assuming that this connector is selected during the trunk-hunting operation of the indicated selector. When thus seized, the connector is conditioned to respond to the impulses of the second and third digits of the directory number designating the substation B. The impulses of these digits are utilized to position the wipers of the connector 18 on the line terminals at which the conductors of the line 9 are terminated. After the line is thus selected, the usual test is performed in the connector 18 to determine the idle or busy condition thereof; and, if busy, a signal to that effect is returned through the selector 16 and the line switch 15 to the line 11. On the other hand, if the called line 9 tests idle, ringing current is transmitted thereover to energize the ringer provided at the substation B and the usual ring-back tone signal is transmitted back over the line 11.

It will be understood that the attendant at the point of observation may, by retaining the dial and talk key 126 in its operated position, monitor the dialing operation to determine when it is completed. In this regard it will be understood that each impulse transmitted by the calling device 20a produces two transient voltages across the conductors of the line 10 which are reproduced as clicks by the receiver of the operator's headset 125. Accordingly, the attendant upon observing that the clicks have ceased, is informed that the dialing operation is completed. Immediately after the dialing operation is arrested, the attendant at the point of observation may actuate the key 174 to the illustrated normal position thereof for the purpose of completing a signal and voice current transmission circuit between the two lines 8 and 9. Incident to this operation the contacts 174b and 174d are opened to disconnect the conductors of the line 10 from the input terminals of the repeating coil 222 and thus effectively disassociate the control portion of the observing apparatus from the connection as set up between the lines 8 and 9. At the contacts 174a and 174c the conductors of the line 10 are connected to the line terminals of the hybrid coil 131, thereby to establish a two-way transmission circuit through the signal current repeater 130 for transmitting voice and signal currents between the lines 11 and 10 in either direction. At the contacts 174e, the path short-circuiting the input terminals of the west-east channel amplifier 136 is opened, thereby to render this channel operative to transmit signal currents from the line 11 to the line 10. At the contacts 174f, an obvious shunt is established across the series-connected contacts 184 and 193, thereby to provide a bridge for holding operated the switch train through which the connection is extended to the line 9, after the relay 185 is released.

Following the operations just described the ring-back or busy tone voltage impressed upon the line 11 in the connector 18 is returned over the line 11 through the repeater 130 and over the lines 10 and 8 to energize the receiver 22a, whereby the calling party is informed that the desired line is busy or that the called substation is being rung. Assuming that the key 126 is retained in its dial and talk position, wherein the operator's headset 125 is bridged across the conductors of the line 10, the attendant at the observation point also receives the transmitted busy or ring-back tone signal. If the call is answered at the called substation, the control equipment of the connector 18 operates in an entirely conventional manner to arrest the ringing operation and to complete a talking circuit between the lines 9 and 11 and, hence, between the substations A and B. In this regard it will be understood that signal currents produced through operation of the transmitter 21b are transmitted to the receiver 22a over a circuit which includes the line 9, the connector 18, the selector 16, the line switch 15, the line 11, the hybrid coil 133, the amplifier 136, the hybrid coil 131, the line 10, the line switch 14, the selector 17, the connector 19, and the line 8. Signal currents originating at the substation A, on the other hand, are transmitted to the receiver 22b over a channel which includes the line 8, the connector 19, the selector 17, the line switch 14, the line 10, the hybrid coil 131, the east-west amplifier 135, the hybrid coil 133, the line 11, the line switch 15, the selector 16, the connector 18, and the line 9. So long as the operator's headset 125 is bridged across the conductors of the line 10, the attendant at the observation point may, of course, listen in on the conversation held between the calling party at the substation A and the called party at the substation B. After the conversation is terminated and the connection is released at both the calling and called ends thereof, the attendant may release the switch train through which the connection is extended to the substation B, by actuating the key 138 to its open-circuit position to open the outgoing loop circuit. When this loop circuit is interrupted, the connector 18, the selector 16, and the line switch 15 are restored to normal in the usual manner. In this regard it will be understood that if the attendant at the point of observation desires to release the connection as set up to the substation A under observation, the keys 126 and 137 may be returned to their respective normal positions in order to interrupt the loop circuit as set up between the point of observation and the connector 19. When this loop circuit is open, the connector 19, the selector 17, and the line switch 14 are successively released in the usual manner. Incident to the release of the connector 19, the private conductor of the line 8 is disconnected from ground to render this line accessible to the other substations of the system.

In the event the call as initiated at the substation A is abandoned at this substation before it is fully extended to the desired substation B, the signal voltage produced through operation of the oscillator section of the impedance detector 160 is transmitted to the receiver of the operator's headset 125 to inform the attendant of the abandonment of the call. Thus when the calling party restores the receiver 22a to the supporting hook of the hook switch 23a to open the loop circuit extending between the substation A and the connector 19, operation of the oscillator section of the impedance detector 160 is initiated in the manner explained above. Incident to the operation of this device, an induced alternating voltage is produced in the winding 164a of the coupling transformer 164. This voltage is transmitted to the receiver of the operator's headset 125 over a path which includes the line windings 222c and 222d of the repeating coil 222, the contacts 174b and 174d of the key 174, and the contacts of the two keys 137 and 126. When reproduced by the receiver of the operator's headset 125, this signal voltage produces a distinctive signal which indicates that the initiated call has been abandoned. Upon receiving this signal, the operator may release the connection as partially completed over the line 11 to a desired substation, by opening the key 138 to interrupt the outgoing loop circuit. The manner in which the switches occupied with the call are released when this loop circuit is broken will be clearly apparent from the foregoing explanation.

In order to condition the control portion of the observing apparatus for use in handling another call after a connection has been extended from the point of observation and then released, the keys 137 and 138 are operated to their respective closed-circuit positions, the key 174 is actuated to its off-normal position, and the key 194 is momentarily operated to its open-circuit position. In response to the latter operation, the parallel-connected windings of the two relays 177 and 189 are deenergized. In releasing, the relay 177 opens its contacts 178 to deenergize the upper winding of the relay 179 and the winding of the relay 185. The relay 179 momentarily reoperates to open its contacts 180 incident to the deenergization of its upper winding. The relay 185, upon restoring, opens its contacts 186 to deenergize the cathode of the diode 195. After this cathode has cooled for a short time interval, the flow of space current therethrough is arrested to deenergize the lower winding of the relay 179 and the winding of the relay 181, causing both of these relays to restore. Following the release of the relays 177, 181, 185 and 189, the key 194 may be returned to its closed-circuit position in order to again energize the holding winding of the relay 177. After this operation is performed, the observing equipment is fully restored to normal and is conditioned to handle another call originating at the observed substation A or at any other substation which may be placed under observation in the manner explained above.

While two different embodiments of the invention have been disclosed, it will be understood that various modifications may be made therein which are within the true spirit and scope of the invention.

What is claimed is:

1. In a signaling system, a local circuit, a first line, a reactive coupling between said local circuit and said first line, means for selectively controlling said local circuit in order to produce through said reactive coupling two different amplitudes of electrical transients on said first line, a second line, and thermionic discriminating means associated with said lines for distinguishing between said different amplitudes of electrical transients and for transmitting a pulse over said second line each time a predetermined one of said amplitudes of electrical transients appears on said first line and for terminating the transmission of a pulse over said second line each time a predetermined different one of said amplitudes of electrical transients appears on said first line.

2. In a signaling system, a local circuit, a first line, a reactive coupling between said local circuit and said first line, means for selectively controlling said local circuit in order to produce through said reactive coupling two different amplitudes of electrical transients on said first line, a second line, and thermionic discriminating means associated with said lines and responsive to the first electrical transient of one of said amplitudes produced on said first line for transmitting a tone signal over said first line to said local circuit and responsive to one or more electrical transients of the other of said amplitudes produced on said first line for transmitting a corresponding number of pulses over said second line.

3. In combination, a local circuit, a line, a reactive coupling between said local circuit and said line, means for controlling said local circuit in order to produce through said reactive coupling electrical transients on said line, discriminating means responsive to a first of said electrical transients produced on said line for transmitting a tone signal over said line to said local circuit, and means responsive to a second of said electrical transients produced on said line for terminating transmission of said tone signal.

4. In combination, a local circuit, a line, a reactive coupling between said local circuit and said line, means for selectively controlling said local circuit in order to produce through said reactive coupling two different amplitudes of electrical transients on said line, and discriminating means associated with said line for distinguishing between said different amplitudes of electrical transients and operated responsive to one of said amplitudes of electrical transients produced on said line for transmitting a tone signal over said line to said local circuit and operated responsive to the other of said amplitudes of electrical transients produced on said line for terminating said tone signal.

5. In a signaling system, a local circuit, a first line, a reactive coupling between said first line and said first line, means for selectively controlling said local circuit in order to produce through said reactive coupling electrical transients of two different amplitudes on said first line, a second line, and thermionic means associated with said lines for distinguishing between the different amplitudes of said electrical transients and responsive to an electrical transient of one of said amplitudes for seizing said second line and responsive to a succeeding electrical transient of the other of said amplitudes for transmitting a pulse over said second line.

6. In a signaling system, a local circuit, a first line, a reactive coupling between said local circuit and said first line, means for selectively controlling said local circuit in order to produce through said reactive coupling electrical transients of high and low amplitudes on said first line, a second line, and thermionic means associated with said lines for distinguishing between the different amplitudes of said electrical transients and responsive to an electrical transient of either said high amplitude or said low amplitude for seizing said second line and then responsive only to an electrical transient of said high amplitude for transmitting a pulse over said second line.

7. In combination with a signal transmitting circuit having a reactive coupling device therein and means for closing and opening said circuit at one end thereof to produce corresponding changes in the impedance of said circuit as measured at the other end thereof, a line, a thermionic impedance detecting device controlled in accordance with the changes in impedance of said circuit as measured at said other end thereof and resulting from the transmission of impulses over said circuit, and means controlled by said detecting device for repeating said impulses over said line.

8. In combination with a signal transmitting circuit having a reactive coupling device therein and means for closing and opening said circuit at one end thereof to produce corresponding changes in the impedance of said circuit as measured at the other end thereof, a line, a vacuum tube oscillator coupled to said circuit at said other end thereof and controlled selectively to oscillate in accordance with the changes in impedance of said circuit resulting from the transmission of impulses thereover, and means controlled by said oscillator for repeating said impulses over said line.

9. In combination with a signal transmitting circuit having a reactive coupling device therein and means for closing and opening said circuit at one end thereof to produce corresponding changes in the impedance of said circuit as measured at the other end thereof, a line, a vacuum tube oscillator coupled to said circuit at said other end thereof and controlled in accordance with said changes in the impedance of said circuit to oscillate each time said circuit is opened at said one end thereof and to stop oscillating each time said circuit is closed at said one end thereof, and means controlled by said oscillator for repeating to said line impulses transmitted over said circuit.

10. In combination with a signal transmitting circuit having a reactive coupling device therein and means including an impulsing device for opening and closing said circuit at one end thereof to produce corresponding transients at the other end thereof and to produce corresponding changes in the impedance of said circuit as measured at the other end thereof, a line, thermionic means adapted to respond to the changes in impedance of said circuit as measured at said other end of said circuit to transmit impulses over said line, and means responsive to a predetermined transient appearing on said circuit for conditioning said thermionic means to respond to the changes in impedance of said circuit resulting from operation of said impulsing device.

11. In combination with a signal transmitting circuit having a reactive coupling device therein and means including an impulsing device for opening and closing said circuit at one end thereof to produce corresponding transients at the other end thereof and to produce corresponding changes in the impedance of said circuit as measured at the other end thereof, a line, thermionic means adapted to respond to the changes in impedance of said circuit as measured at said other end of said circuit to transmit impulses over said line, and means responsive to the first transient appearing at said other end of said circuit as a result of operation of said impulsing device for conditioning said thermionic means to respond to the changes in impedance of said circuit which result from the operation of said impulsing device.

12. In combination with a signal transmitting circuit having a reactive coupling device therein and means including an impulsing device for opening and closing said circuit at one end thereof to produce corresponding transients at the other end thereof and to produce corresponding changes in the impedance of said circuit as measured at the other end thereof, a line, thermionic means adapted to respond to the changes in impedance of said circuit as measured at said other end of said circuit to transmit impulses over said line, means responsive to the first transient appearing on said circuit at said other end thereof for transmitting a signal over said circuit, and means responsive to the first transient appearing at said other end of said circuit as a result of operation of said impulsing device for terminating said signal and for conditioning said thermionic means to respond to the changes in impedance of said circuit which result from the operation of said impulsing device.

BARNEY J. KUCERA.

REFERENCES CITED

The following references are of record in the file of this patent:

UNITED STATES PATENTS

| Number | Name | Date |
| --- | --- | --- |
| 1,640,085 | Madsen | Aug. 23, 1927 |
| 1,691,554 | Saville | Nov. 13, 1928 |
| 1,936,947 | Morgenstern | Nov. 28, 1933 |
| 2,137,798 | Bowman-Manifold | Nov. 22, 1938 |
| 2,262,838 | Deloraine | Nov. 18, 1941 |

FOREIGN PATENTS

| Number | Country | Date |
| --- | --- | --- |
| 497,147 | Great Britain | Dec. 9, 1938 |